United States Patent [19]

Haley

[11] 4,023,672
[45] May 17, 1977

[54] TRANSFER TABLE

[76] Inventor: Ernest K. Haley, 134 Northwestern Parkway, Louisville, Ky. 40222

[22] Filed: Oct. 3, 1975

[21] Appl. No.: 619,161

[52] U.S. Cl. .............................. 198/735; 193/35 R; 198/476
[51] Int. Cl.² ........................................ B65G 19/00
[58] Field of Search .......... 198/170, 172, 173, 174, 198/23, 105, 208, 725, 735, 476; 193/35 R

[56] References Cited

UNITED STATES PATENTS

| 669,232 | 3/1901 | Case | 198/208 |
|---|---|---|---|
| 1,132,840 | 3/1915 | Garrett | 198/105 |
| 1,462,511 | 7/1923 | Lister | 198/170 |
| 2,729,321 | 1/1956 | Morrison | 193/35 R |

FOREIGN PATENTS OR APPLICATIONS

790,944  2/1958  United Kingdom ............. 193/35 R

*Primary Examiner*—Evon C. Blunk
*Assistant Examiner*—Douglas D. Watts
*Attorney, Agent, or Firm*—David H. Semmes

[57] ABSTRACT

A transfer table for storage and lateral transport of elongated structural members, such as I-beams, including a plurality of elongated supports defining a lateral carriage for said structural members and each support having four trains of idler rollers staggered upon transverse axes atop the support. A conveyor drive is rotatably positioned fore and aft with respect to the support and intermediate pairs of the roller trains, such that the I-beam may be easily glided over the rollers.

9 Claims, 11 Drawing Figures

TRANSFER TABLE

BACKGROUND OF THE INVENTION

1. Field of the Invention

Material handling, particularly handling of structural members, such as I-beams in systems which may include a cold saw and measuring system, and a structural drilling system. Conventionally, I-beams are delivered longitudinally upon power driven rollers into the cutting and drilling operations. Longitudinal advancing of the I-beams has not presented a particular problem. However, lateral transfer from one line of longitudinal advancement to another line of longitudinal advancement, such as from the cutting to the drilling console has presented an immense problem. Traditionally, the I-beam with its flanges presented vertically, is dragged across two or more tracks from one line of longitudinal advancement into another. This dragging presents massive frictional problems, which can be overcome only by the use of massive horsepower, and the attendant noise and objectional screeching noise reaches unacceptable levels. Earlier inventors have attempted to solve the problem by employing a plurality of rollers which may engage the I-beam web. However, such systems have been so complex as to render them economically and practically unacceptable.

DESCRIPTION OF THE PRIOR ART

| | |
|---|---|
| HUBER | 585,869 |
| FAWELL | 895,621 |
| THOMAS | 896,172 |
| DRAKE | 1,761,199 |
| DRAKE | 1,865,890 |
| CARPENTER | 2,024,024 |
| KENDALL | 2,701,049 |
| KORNYLAK | 3,374,877 |
| BERGLING | 3,471,002 |

The early patent to Huber, U.S. Pat. No. 585,869 illustrates an elevatable portion at one end of a transfer table in combination with rollers that are driven through a common drive means. Similarly, Fawell, U.S. Pat. No. 895,621 illustrates a system of gear driven rollers, which include a modification at FIG. 7 and 8 for segmented circular elements. Apparently, Fawell's purpose for staggering the rollers is to reduce the gap between the roller centers. Thomas 896,172 shows a series of driven conveyor rollers wherein power consumption is reduced through drive among alternating rollers. The patents to Drake (U.S. Pat. Nos. 1,761,199 and 1,865,890) are particularly disclosed for use with glass handling apparatus, showing the use of a series of rollers which are adjustable upon vertically staggered centers. In Drake U.S. Pat. No. 1,865,890 the rollers 31 are selectively vertically positionable to distribute the load and speed of movement of the sheet to be conveyed.

Carpenter, U.S. Pat. No. 2,024,024 and Kendall U.S. Pat. No. 2,701,049 both illustrate power driven conveyors for particular utility in a metal heat treating device. Carpenter shows rollers comprising segmented wheels on a common spline wherein the wheels are intermeshing. Kendall shows an hydraulic coupling for distributing torque in an economical fashion to respective rollers so as to prevent slipping between the object to be carried and the rollers, while preventing excessive noise levels.

Kornylak, U.S. Pat. No. 3,374,877 shows a series of gear-driven live rollers which are adaptable to sectional construction. Bergling U.S. Pat. No. 3,471,002 shows a driven roller construction where an adjustment element 5 is available to laterally position and offset a particular roller shaft from its adjacent roller shaft.

SUMMARY OF THE INVENTION

According to the present invention, a table for storage and lateral transport of elongated structural members such as I-beams, is comprised of a plurality of longitudinally extending supports defining a lateral carriage. Each support has on its top surface four trains of idler rollers each roller train being mounted upon a transverse axis which is longitudinally staggered with respect to the axis of the laterally adjacent roller train. The rollers may be staggered upon one quarter inch centers, such that I-beam flanges of 1/4 inch or more are never resting upon a single roller. A conveyor drive means extends longitudinally along each support, and is rotatably positioned fore and aft with respect to the elongated support intermediate pairs of roller trains and includes a dog having a lug which may be pivoted above the surface of the rollers, so as to engage an I-beam support thereon. The I-beam may then be glided across the rollers by extremely low horsepower drive of the conveyor. Modifications include pivoting one or both ends of the longitudinally extending support, so as to employ gravitational assistance in loading or unloading the table.

DESCRIPTION OF THE PREFERRED EMBODIMENTS

Figure 1:
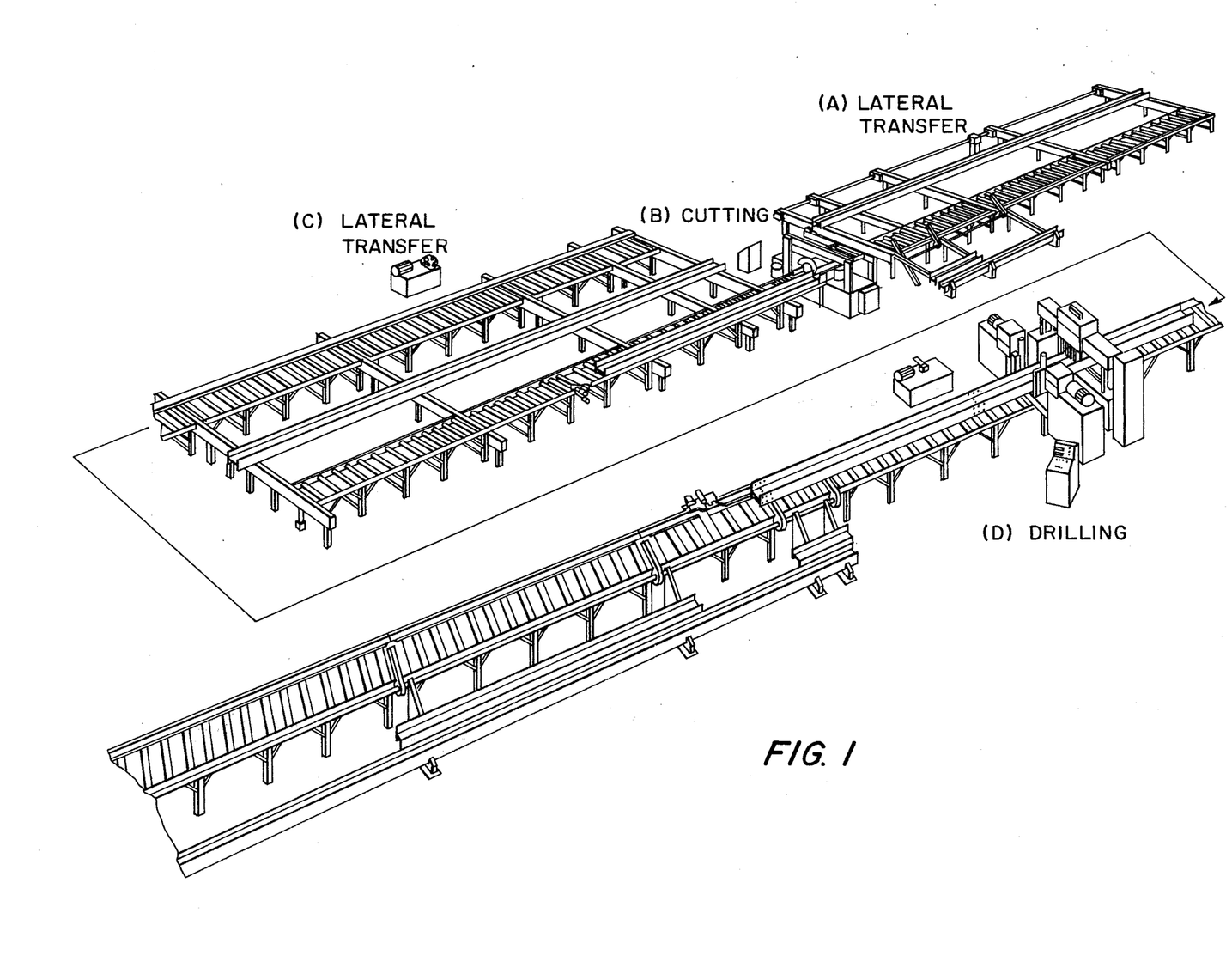
FIG. 1 is a schematic view showing employment of the transfer and storage table for handling of I-beams both anteriorly of a cold saw measuring and cutting console and an I-beam drilling console.

In FIG. 1 there are illustrated two types of lateral transfer stations, constructed according to the present system. The first type (A) is designated as a saw feed and storage table for delivering an elongated I-beam across its support members and into a power driven roller line which feeds the cold saw cutting and measuring system (B). As the I-beams are cut, they may be advanced axially along a suitable longitudinal roller drive into tranfer table (C), the power driven rollers may be mounted at the conveyor level of lateral transfer table C. The I-beams may be then stored, random I-beam length storage being provided by the staggering of the support members. As the beams are required to be advanced to the drilling console (D), the transfer table conveyor may be activated so as to laterally advance the beams upon the staggered rollers and into power driven longitudinal conveyor line for drilling of the I-beam web and flange, as the case may be. Subsequently to drilling, the I-beams may be again advanced longitudinally and then removed by lateral beam unloader means or by a transfer table of the type illustrated, for example, in FIG. 7.

Vertical drilling of the webs with retractable spindles and variable drill speeds may be accomplished at the drilling console. Similarly, horizontal drilling into each flange of the I-beam may be accomplished at drilling console (D).

Figure 2:
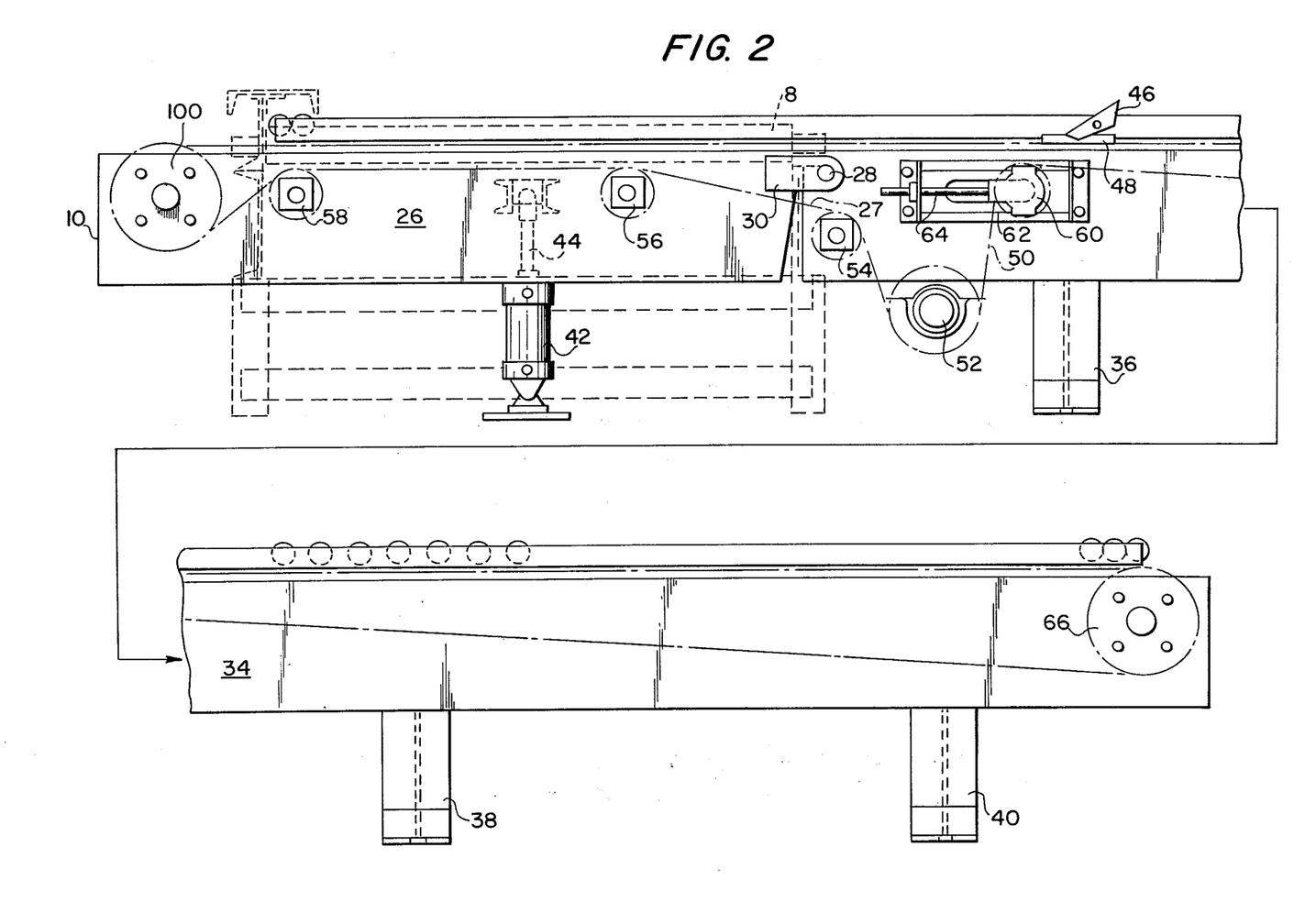
FIG. 2 is a fragmentary side elevation, partially in phantom, showing the conveyor rotatably positioned fore and aft with respect to the elongated suppport and intermediate the trains of staggered rollers.
Figure 3:
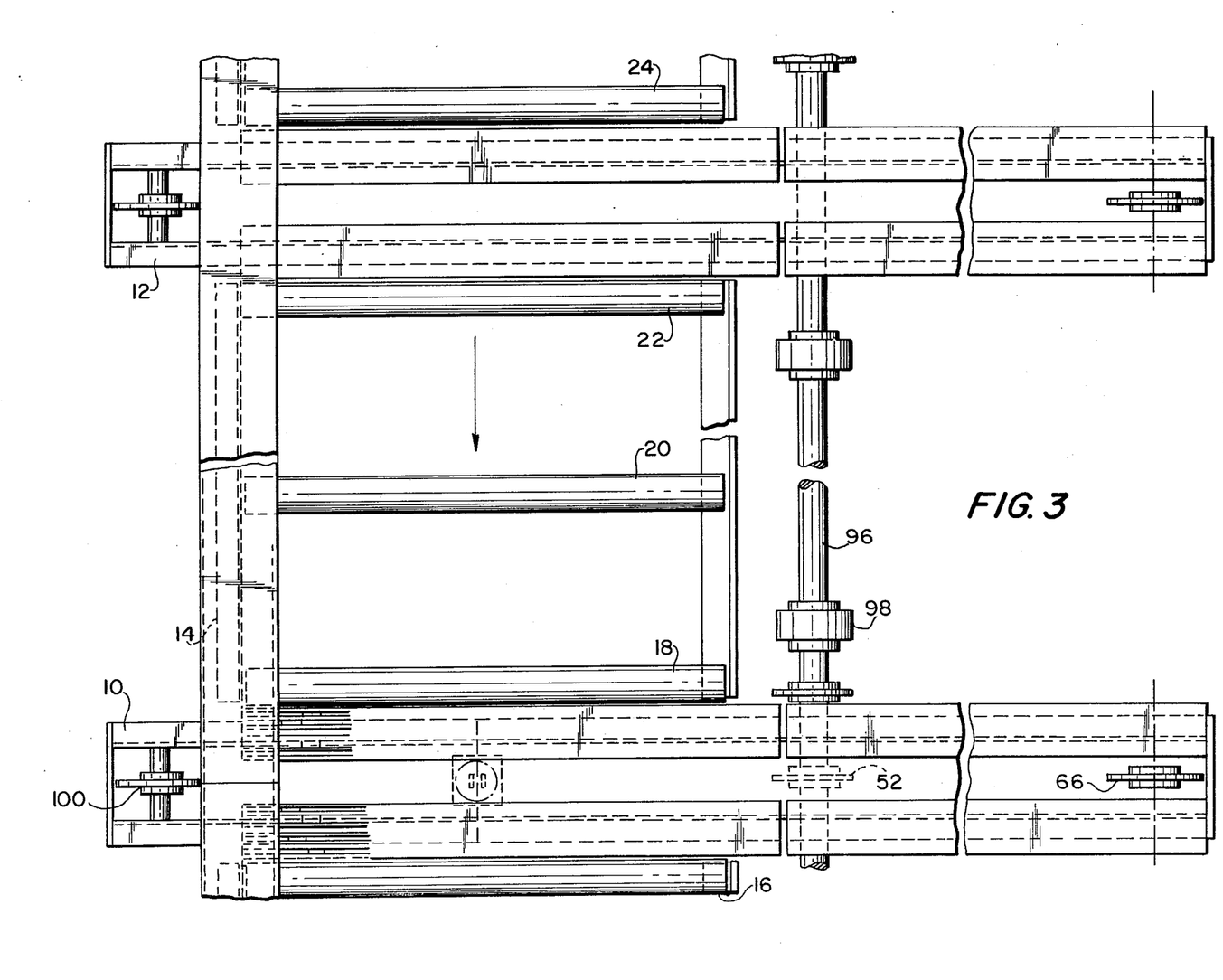
FIG. 3 is a fragmentary top plan, showing position of two longitudinally extending members pivotable on the left-hand side for unloading from a meshing longitudinal roller drive mechanism.

In FIGS. 2 and 3 there are illustrated longitudinally extending support members 10 and 12, positioned such that their pivoted ends 26 intermesh with power driven rollers 16, 18, 20, 22 and 24 in the longitudinal roller drive system. As the I-beam is advanced upon the power driven rollers, it may be transferred laterally onto the transfer and storage table by upward pivoting of member 26 by means of hydraulic cylinder 42 and piston 44. As the member 26 is pivoted upon dog 30 as at pin 28, the I-beam is assisted gravitationally in gliding from the longitudinally extending power driven conveyor rollers 18-24 onto the trains of staggered rollers positioned upon each longitudinally extending support, 10 and 12.

A chain conveyor 27 may be rotatably positioned fore and aft of the elongated support member 10 by means of idler rollers 54, 56, 58, 60, 66 and 100 as well as drive sprocket 52. Tension upon the chain conveyor may be adjusted by sliding of roller 60 in its track 62 and upon threaded shaft 64. The chain conveyor may support plate 48 upon which dog 46 may be pivoted, for example, by pneumatic means to engage the front or back flange of an I-beam or the like. Manifestly, the conveyor may be driven in either direction, so as to advance or retract the I-beam.

As illustrated in FIG. 3, common drive shaft 96, having coupling 98, may be employed to drive sprocket 52, advancing the conveyor with platform 48 and dog 46, as well as the engaged I-beam across the tops of the trains of staggered rollers.

Figure 4:
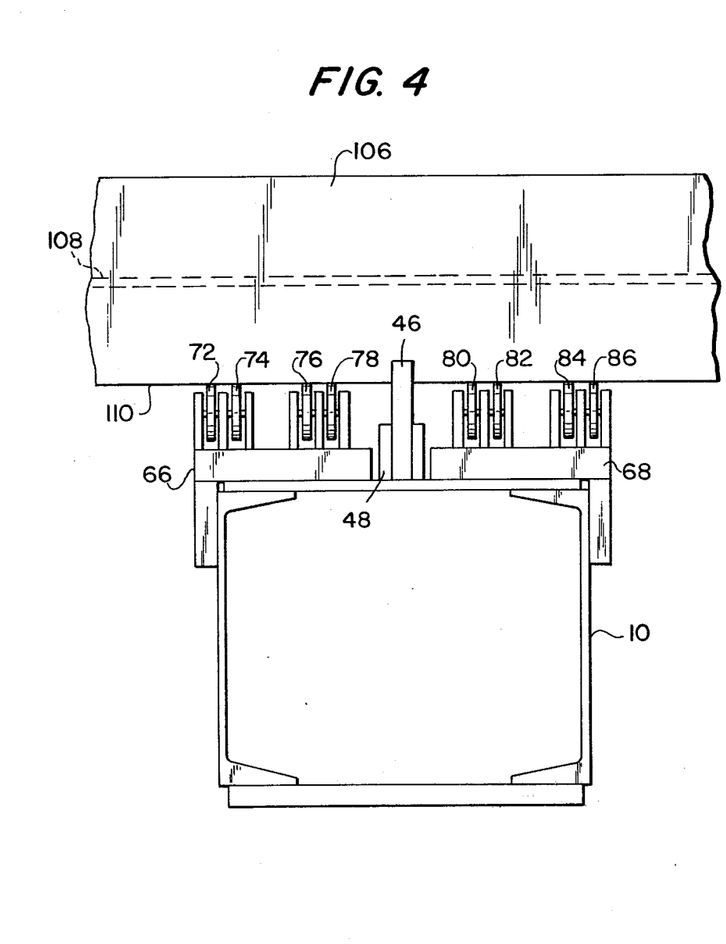
FIG. 4 is a fragmentary end elevation of a longitudinally extending support, showing four roller trains supported upon a staggered axis and engaging an I-beam flange.

In FIG. 4 there is fragmentarily illustrated an I-beam supported upon four trains of staggered rollers mounted upon separate plates 66 and 68. Each roller train is staggered with respect to the adjacent train, as hereinafter explained. Within a given roller train, the train begins with a first roller transversely and longitudinally spaced from a second roller, for example, rollers 84 and 86 as shown, in FIGS. 5 and 11. The first staggered roller 72, of a first roller train is positioned upon a transverse axis. The first roller train includes a second roller, 74, and in like fashion the second roller train begins with a first roller 76 and second roller 78. The third roller train has a first roller 80 and a second roller 82. The fourth roller train has a first roller in FIG. 5, and in FIG. 11 there is illustrated a roller 89 immediately behind roller 86, in continuation of the train.

The first roller of each roller train is positioned upon a transverse axis ¼ inch staggered with respect to the first roller of its adjacent roller trains. Similarly, the second roller of each roller train is positioned upon a transverse axis ¼ inch staggered with respect to the second roller of its adjacent roller trains. For example, first rollers 72, 76, 80 and 84 are progressively staggered in the longitudinal direction on centers that are ¼ inch apart, and second rollers 74, 78, 82 and 86 are progressively staggered in the longitudinal direction on centers that are ¼ inch apart.

Hence, the four roller trains on longitudinal support 10 in FIG. 4 ensure that four rollers are supported upon axes throughout one linear inch of that longitudinally extending support member. This enables surface support of an I-beam 106 having a flange 110 of ¼ inch or more, the I-beam web 108 being shown in phantom.

Figure 5:
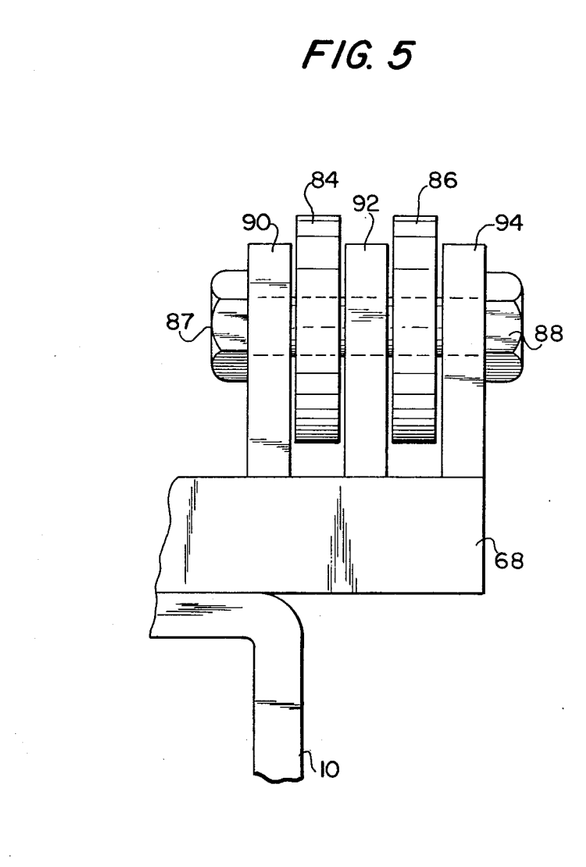
FIG. 5 is an enlarged fragmentary showing of the support of a roller train.
Figures 10, 11:
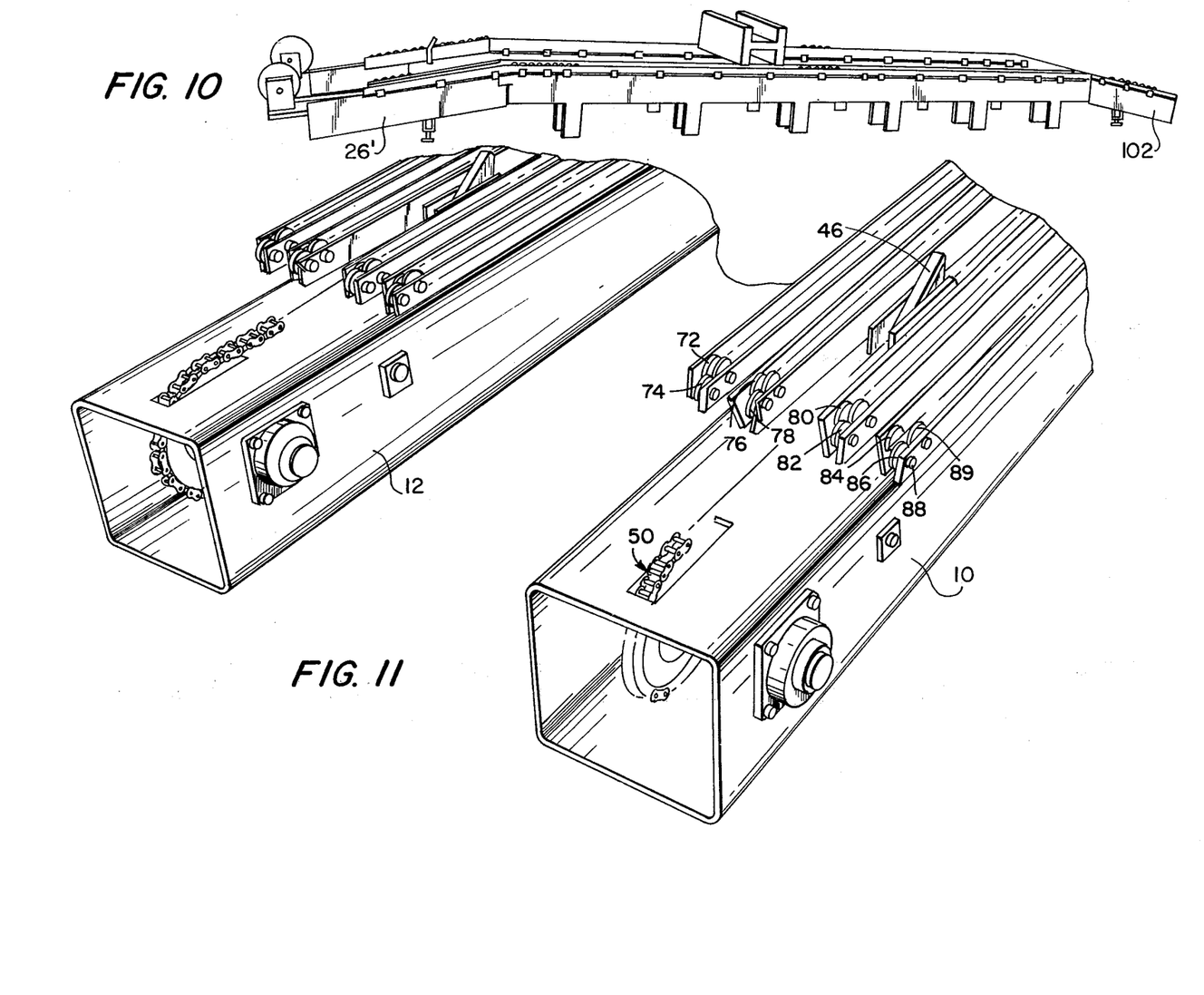
FIG. 10 is a fragmentary perspective of the elongated structural member, illustrated in FIG. 6; showing an I-beam supported therein.
FIG. 11 is an enlarged fragmentary perspective of adjacent ends of the elongated structural members with the chain conveyor rotatably supported intermediate the two innermost roller trains.

The fourth roller train is illustrated in more detail at FIG. 5, with its first roller 84 mounted upon a bolt 87, and its second roller 86 mounted on a bolt 88. The centerline of bolt 87 is longitudinally spaced one inch from the centerline of the bolt for roller 86, or midway between the centerline of rollers 86 and 89, as shown in FIG. 11. Hence, as above-noted every linear inch of longitudinal travel will include four rollers, for each support member. In FIG. 5 there is fragmentarily illustrated the support of rollers 84 upon a ½ inch bolt, 87, extending through 2 × ⅜ inch flats 90 and 92 secured vertically to plate 168. Roller 86 is shown mounted upon a staggered ½ inch bolt 88 extending through flats 92 and 94. Rollers 85 and 86 are dimensionally illustrated in FIG. 5 to be of a diameter slightly less than 2 inches, so that the centerline of bolt 87 may be spaced one inch from the centerline of bolt 88, whereby the ¼ inch staggering between the centerlines of rollers 86, 82, 78 and 74 is thereafter continued between, for example, the centerline of roller 74 and the centerline of roller 84, as noted above.

Figure 6:
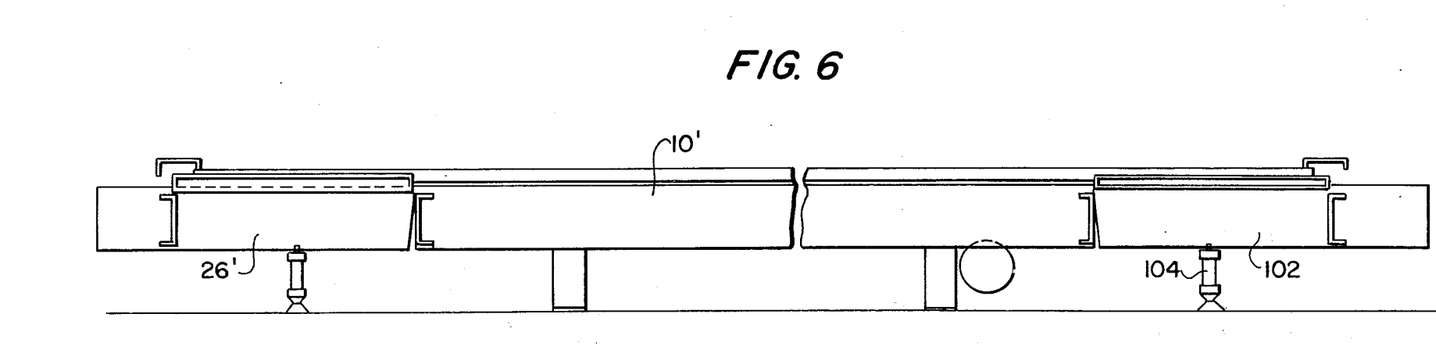
FIG. 6 is a side elevation, showing a single longitudinally extending support member having an ends or skids pivotable as an assistance in loading and unloading at each end.

In FIG. 6 there is illustrated a type of transfer table (C) as appearing in FIG. 1, wherein pivoted work skids are provided at either end of the transfer table for loading and unloading purposes.

Figure 7:
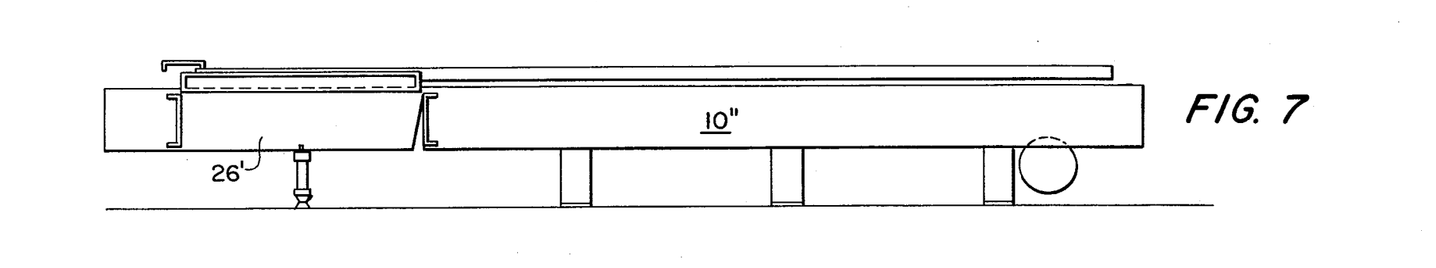
FIG. 7 is a modification showing a transfer table having a load skid pivoted at its left end and actuable by means of an hydraulic lift cylinder.
Figure 8:
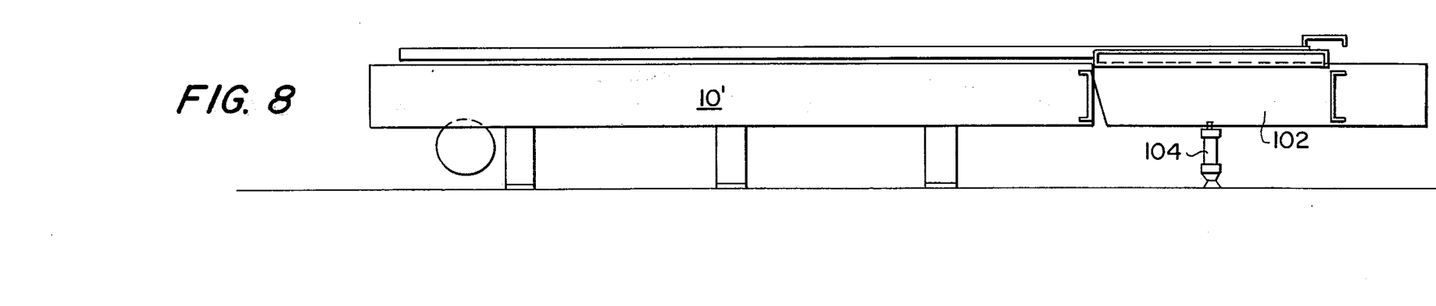
FIG. 8 is a further modification having a skid pivoted at its right end for assistance in loading, for example, from the power driven cutting operation (B) illustrated in FIG. 1.

In FIG. 7 there is illustrated the modification (A) shown in feeding of the cold saw cutting and measuring system (B) at the righthand side of FIG. 1;

FIG. 8 is a modification for unloading from an axially advancing system by means of pivoted section 102 and hydraulic cylinder 104.

Figure 9:
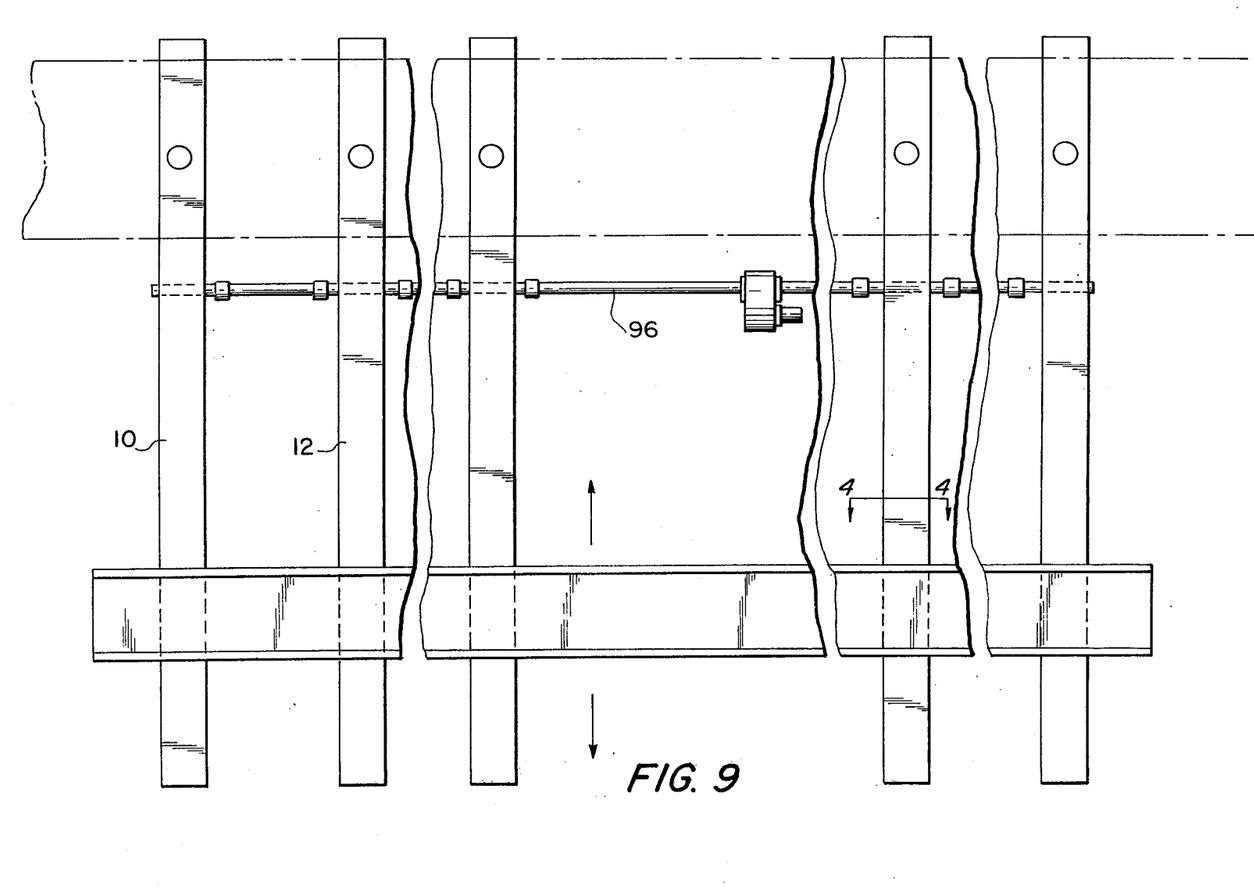
FIG. 9 is a fragmentary top plan of the system, such as illustrated in FIGS. 1 and 8, showing an I-beam structural member positioned thereon and including longitudinally extending supports at staggered distances with respect to each other, so as to support I-beams of varying lengths.

In FIG. 9 there is a further top showing of the arrangement wherein the structural member I-beam 106 is moved transversely upon longitudinally extending supports at spaced apart distances;

FIG. 10 is a perspective showing of the modification (C), illustrated in FIG. 6, wherein both ends of the support are pivoted on a work stud; and FIG. 11 is an enlarged fragmentary perspective showing juxtaposition of the chain drive conveyor with respect to the train of staggered rollers mounted upon adjacent supports 10 and 2.

Manifestly, various types of rollers may be employed, the elongated support members may be varied and the conveyor system changed without departing from the invention.

We claim:

1. A transfer table operable for storage and lateral transfer, in a longitudinal direction, of I-beams and the like that are presented supported upon transversely and vertically extending flanges, said flanges having bottom dimensions, in the longitudinal direction, as narrow as ¼ inch, comprising:
   A. at least two longitudinally extending supports; and
   B. four roller trains mounted upon each longitudinal support, each of said trains extending in said longitudinal direction and each roller train further comprising a first roller mounted upon a first transverse axis and a second roller mounted upon a second transverse axis which is transversely and longitudinally spaced from said first transverse axis, wherein each roller train is positioned so that the first and second transverse axes of each roller train are staggered on ¼ inch centers with respect to the corresponding first and second transverse axis of adjacent roller trains, whereby four rollers per linear inch are provided in said longitudinal direction upon said supports; and,
   C. a conveyor drive means extending longitudinally along said each longitudinal support, said conveyor means being rotatably mounted fore and aft with respect to said roller trains, such that said conveyor extends longitudinally intermediate two of said roller trains; and,
   D. a dog supported upon said conveyor means operable to engage said transversely and vertically extending flanges on an I-beam and the like in order to laterally transport said I-beam upon said roller trains at a right angle, with respect to said transverse axes, and longitudinally, with respect to said longitudinal extending supports.

2. A transfer table as in claim 1, said longitudinally extending supports having a pivoted section at one end, so as to invoke gravitational assistance in loading and unloading structural members upon said transfer table.

3. A transfer table as in claim 1, said longitudinally extending supports having pivoted sections at each end.

4. A transfer table as in claim 2, including hydraulic means engaging said pivoted member, so as to move said pivoted section with respect to said table.

5. A transfer table as in claim 4, said conveyor being of the chain drive type and including a tension-adjusting mechanism.

6. A transfer table as in claim 1, including a common drive shaft for said chain conveyors and extending transversely with respect to said supports.

7. A transfer table as in claim 1, said dog being pivotable from a non-engaging profile beneath the top of said rollers upwardly to a structural member engaging profile above said rollers.

8. A transfer table as in claim 1, wherein said conveyor drive means extends intermediate two innermost roller trains on each of said longitudinally extending supports.

9. A transfer table, as in claim 1, wherein said second transverse axis is longitudinally spaced one inch from said first transverse axis for each of said four roller trains on each of said longitudinally extending supports.

* * * * *